3,376,199
SOFT CAPSULATED AQUEOUS MEDICAMENT IN WATER-IN-OIL EMULSION FORM
Clarence Leonard James Coles, Ruislip, and David John Trigger, Dartford, Kent, England, assignors to Glaxo Laboratories Limited, Greenford, England, a British company
No Drawing. Filed Mar. 6, 1964, Ser. No. 350,087
Claims priority, application Great Britain, Mar. 12, 1963, 9,762/63
30 Claims. (Cl. 167—83)

ABSTRACT OF THE DISCLOSURE

There is disclosed the presentation of an oral dosage unit of an aqueous medicament in a soft gelatin capsule. The medicament is in the form of a water-in-oil emulsion, the emulsion and the continuous oil phase thereof having viscosities such that at the normal storage temperature of the capsulated composition, migration of the globules of the internal water phase is substantially prevented.

---

This invention is concerned with pharmaceutical capsulated compositions, and particularly capsulated compositions of the so-called soft type.

There are two forms of capsule commonly used in pharmacy, that is hard and soft capsules. The hard capsules are used in the presentation of powders and are made of a water-soluble plastic material, e.g., gelatin or methyl cellulose. The soft capsules are normally made of a water-soluble plastic material e.g., gelatin, plasticised with, for instance, glycerine (i.e., glyco-gelatin). These soft capsules are used in the presentation of non-aqueous oily liquids and can be formed for example around a metered dose of the liquid from two sheets of plasticised gelatin by means of capsulating machines such as are described in British specifications Nos. 395,546, 564,538, 564,539, 564,540 and 564,541.

There has hitherto been difficulty in using soft capsules in the presentation of medicaments in the form of aqueous solutions or suspensions as the capsules are inherently water-soluble. It is an object of the present invention to provide a soft capsulated composition containing aqueous solutions or suspensions of one or more medicants which is stable at the temperature at which it is usually stored.

Attenuated oral poliomyelitis vaccine is generally used as an aqueous dispersion or solution and is an example of a medicament which could most conveniently be administered in a soft capsule provided that such a capsule was stable at the storage temperature of the vaccine, which may for example be 4° C. We have attempted to prepare such gelatin capsules in which the aqueous component is incorporated in a syrup of high osmotic pressure but without success. Also, soft gelatin capsules in which the aqueous component is in the form of a water-in-oil emulsion have been found to collapse after a short time with rapid loss of the water from the emulsion to the gelatin shell with consequent softening and deformation.

We have now discovered, however, that soft capsules of generally satisfactory stability containing an aqueous medicament can be prepared by incorporating the aqueous material in the capsule in the form of a water-in-oil emulsion provided that the viscosities both of the emulsion as a whole as well as the continuous phase by itself are made sufficiently high that the aqueous globules are prevented from migration. In particular we have found that it is insufficient for the emulsion as a whole to be highly viscous; the continuous phase in itself must also be of sufficiently high viscosity. Thus it is possible to prepare water-in-oil emulsions of high viscosity, but in which the viscosity of the oil phase is quite low; such emulsions we have found do not have sufficiently good stability in soft capsules.

According to the invention, therefore, there is provided a soft capsulated pharmaceutical composition containing an aqueous medicament in the form of a water-in-oil emulsion, said emulsion and the continuous phase thereof having viscosities such that, at the storage temperature (as herein defined) of the capsulated composition, migration of the globules of the internal water phase is substantailly prevented.

It will be appreciated that by the viscosity of the continuous phase of the emulsion we mean the viscosity of the material which provides the continuous phase measured before incorporation of that material into the emulsion.

The prevention of any substantial migration of the globules of the water phase is an essential feature of the invention. If there is any tendency for water globules to migrate to the walls of the capsule, then instability results and the capsule collapses. It is possible to determine readily whether or not migration of water globules is occurring in the case of any particular emulsion at a given treatment by storing a standardised quantity of the emulsion in contact with glyco-gelatin sheet, as used for capsulation, in glasswater. Any tendency to phase separation and emulsion flocculation can be readily assessed visually. In general it has been found that for satisfactory stability the viscosity of the emulsion at 20° C. should be at least 6,000 cps. at a shear rate of 1 sec.$^{-1}$, and the viscosity of the continuous phase of the emulsion should be at least 100 cps. at higher shear rate (and therefore independently of shear rate) at 20° C. It is preferable however that the viscosity of the emulsion at 20° C. should be at least 10,000 to 11,000 cps. at a shear rate of 1 sec.$^{-1}$ while best results are obtained with viscosities at 20° C. of at least 15,000–16,000 cps. at a shear rate of 1 sec.$^{-1}$. The viscosity of the continuous phase, on the other hand, is advantageously at least 370–380 c.p.s. at high shear rate at 20° C.

By the term "storage temperature" of the capsule is meant the temperature at which the capsule will normally be stored having regard to the medicament contained in it. It is often necessary, for instance, in the case of vaccines to use storage temperatures well below ambient temperature in order to preserve the activity of the vaccine, and in such cases it is only necessary that the emulsion and the continuous phase thereof should have the required viscosities at the reduced temperature. The rise in temperature when the capsule is removed from refrigerated storage will of course generally be accompanied by a decrease in the viscosities, but only a very short time, insufficient to cause break down of the capsule, normally elapses between this and the administration of the capsule. With medicaments which are stable at ambient temperature, the "storage temperature" is likewise ambient temperature.

In some cases where deep refrigeration is possible it is sufficient that migration of the water in the emulsion does not take place at −20° C. In accordance with a preferred feature of the invention, the emulsion phase is so formulated that migration of the water phase does not take place at 4° C. and more preferably does take place at 20° C. By proceeding in this way compositions are obtained which are stable at or above refrigerator temperatures or room temperature respectively.

The medicaments to be incorporated in the compositions may be of the most varied type and in general may comprise any substance it is desired to administer in aqueous form for human or veterinary medical purposes. The invention is particularly applicable to the administration of aqueous vaccines. Other water-soluble medicaments can also with advantage be formulated in accordance with the invention. For example certain substances such as steroidal phosphates, e.g., prednisone phosphate, may as solids cause irritation of the stomach wall and thus can with advantage be presented in solution in accordance with the invention. The soft capsules according to the invention are especially suitable for administration of oral poliomyelitis vaccine, and can also be used with advantage for the administration of oral measles vaccines.

The oil phase of the water-in-oil emulsion preferably comprises a mineral oil, although a vegetable oil may also be used. Suitable vegetable oils include arachis, olive, sesame, soya bean, castor and cottonseed oils as well as oily esters such as ethyl oleate, dibutyl sebacate and isoamyl salicylate. Mineral oils of a pharmaceutical grade are, however, to be preferred, for example the liquid paraffin according to the British or United States Pharmacopoeias. Alternatively, a silicone oil may be used in the oil phase if so desired. In order to provide an oil phase of the desired viscosity, for example at least 100 c.p.s. at 20° C. and high shear rate, it may be necessary to add a thickening agent to the oil. One particularly convenient thickening agent is white soft paraffin according to the British Pharmacopoeia. Other thickening agents which may with advantage be used include yellow soft paraffin, hard paraffin, white beeswax, yellow beeswax, wool fat and wool alcohols, all according to the British Pharmacopoeia or the British Pharmaceutical Codex, microcrystalline waxes of solid or semi-solid consistency (being highly-refined grades of paraffin hydrocarbons), vegetable stearines, hydrogenated vegetable fats, ethyl cellulose, and certain polyvalent metal soaps such as aluminium stearate.

The proportion of thickening agent to oil may vary over a wide range dependent on the nature of the oil and thickening agent respectively and the desired viscosity of the continuous phase of the emulsion. Where for example the oil is liquid paraffin and the thickening agent is white soft paraffin the proportion of the latter in the oil is preferably within the range of from 1 to 40% by weight, about 8% by weight having been found to produce very satisfactory results. It will be appreciated, however, that it may be necessary to use a different oil and/or thickening agent with medicaments stored at higher temperatures (although the above-mentioned liquid paraffin/white soft paraffin mixture has been shown to possess an adequate viscosity at as high a temperature as 20° C.), and it is possible by simple experiment to determine the composition of a suitable oil for any desired storage temperature. In general, the continuous oil phase of the emulsion is conveniently made as viscous as possible to ensure that migration of the internal water phase is substantially prevented.

It is desirable to stabilise the water-in-oil emulsion by means of an oil-soluble emulsifying agent, although this may not always be essential when the continuous oil phase is so viscous as to be substantially solid. As is well known, the formation of the water-in-oil emulsions as distinct from oil-in-water emulsions involves a suitable choice of emulsifying agent or agents having regard to the relative proportions of the oil and water phases and their exact nature.

The emulsifying agents used are preferably of the non-ionic type, and the following are suitable non-ionic oil-soluble emulsifying agents which may conveniently be employed:

(a) Polyhydric alcohols, or their anhydrides, esterified with fatty acids, such as, for example sorbitan monooleate, sorbitan sesquioleate, sorbitan monostearate, propylene glycol monostearate, diglycol monostearate, mannitan mono-oleate, mannide mono-oleate, glyceryl monostearate, propylene glycol mono-laurate, diglycol monooleate, diglycol monopalmitate, diglycol monoriconoleate, pentaerythritol mono-stearate, pentaerythritol glyceryl oleate, pentaerythritol dioleostearate, low-molecular polyoxyethylene oleate, glyceryl mono-groundnut acid ester, polyglyceryl monostearate, polyglyceryl oleate, glycol monostearate, glyceryl mono-oleate, glyceryl monopalmitate and low-molecular polyoxyethylene monostearate.

(b) Glycerol polyhydric alcohol anhydride esters such as, for example, glycerol sorbitan laurate and glycerol mannitan laurate.

(c) Polyoxyethylene fatty ethers, particularly such ethers having a short polyoxyethylene chain, such as, for example, polyoxyethylene (4) lauryl ether, polyoxyethylene (2) cetyl ether, polyoxyethylene (2) stearyl ether and polyoxyethylene (2) oleyl ether.

(d) Solid particle emulsifying agents such as, for example, calcium oleate and magnesium stearate.

In general, it has been found convenient to use an emulsifying agent, or a mixture of emulsifying agents, having a hydrophilic lipophilic balance (HLB) of from 1 to 8, preferably from 2 to 5 and especially about 4. It is often desirable to use a mixture of emulsifying agents giving the required HLB, and one suitable mixture comprises Arlacel 83 (sorbitan sesquioleate) and Arlacel 80 (sorbitan mono-oleate), which have a HLB of 3.7 and 4.3 respectively. These two substances may for example be used in equal proportions giving an HLB for the mixture of about 4. A mixture of Span 85 (sorbitan trioleate) and Tween 81 (polyoxyethylene sorbitan monooleate) may also with advantage be used.

The proportion of emulsifying agents used will depend on their nature, but we have found that a proportion in the range of from 1 to 7%, and especially 2 to 6%, by weight gives satisfactory results. It should be noted that too great a proportion of emulsifying agent is undesirable and may cause instability of even breaking of the emulsion or phase reversal.

The proportion of oil phase in the emulsion is also important, and the emulsion contains oil in a proportion preferably in the range of from 20 or 25 to 95%, particularly 50 to 70% and especially about 60%, by weight.

In order to determine the suitability of a given set of emulsion components for preparing a stable water-in-oil emulsion, one may merely blend the components and homogenise and leave the emulsion so formed to stand for a prolonged period at a desired storage temperature. Any tendency to separation or complete cracking can then be simply observed. It will of course always be necessary to select emulsion components which are compatible with the aqueous medicaments incorporated into the capsulated compositions according to the invention.

In the preparation of the filling for the capsules according to the invention, it is convenient to blend the oil, the aqueous solution or suspension containing the medicament, and the emulsifying agents and homogenise. This can be done at an elevated temperature, for example at about 60° C., when the medicament involved is stable at such a temperature but in the case of vaccines the use of elevated temperatures normally has to be avoided. It is then necessary to select emulsifying agents which enable emulsification to be effected at ambient temperature or below. If desired, the material used for the walls of the capsules, for example glyco-gelatin sheeting, may be treated on the side which is to provide the inner walls of the capsules with a hydrophobic substance such as, for example, silicone oil or aluminium stearate.

The following examples, in which all percentages are by weight, illustrate the invention:

EXAMPLE 1

A water-in-oil emulsion having the following composition is prepared:

| | Percent |
|---|---|
| Arlacel 83 | 2.5 |
| Arlacel 80 | 2.5 |
| Liquid paraffin/white soft paraffin in a ratio of 92:8 | 60.0 |
| Aqueous phase containing attenuated poliomyelitis virus | 35.0 |

The emulsion is used to prepare soft gelatin capsules containing $10^5$ virus particles per capsule. The capsules are stable indefinitely at −20° C. and for seven weeks at room temperature. In particular, a relatively small proportion (e.g., less than about a third) of the water content of the emulsions contained in the capsules is absorbed from the emulsions by the gelatin shells of the capsules during storage for seven weeks at room temperature.

This compares favourably with the result obtained using an emulsion as described above in which the oil is solely light liquid paraffin. Capsules prepared from such an emulsion collapsed after 3 to 4 days at room temperature. Moreover, substantially all the water from the emulsions in the capsules was absorbed by the gelatin shells such that the capsules merely contain the clear continuous oil phase.

EXAMPLE 2

A water-in-oil emulsion having the following composition is prepared:

| | Percent |
|---|---|
| Span 85 | 3.7 |
| Tween 81 | 1.3 |
| Liquid paraffin/white soft paraffin in a ratio of 92:8 | 60.0 |
| Aqueous phase containing attenuated poliomyelitis virus | 35.0 |

The emulsion is used to prepare soft gelatin capsules containing $10^5$ virus particles per capsule. The capsules are stable indefinitely at −20° C. and for seven weeks at room temperature.

This compares favourably with the result obtained using an emulsion as described above in which the oil is solely light liquid paraffin. Capsules prepared from such an emulsion collapsed after 3 to 4 days at room temperature.

EXAMPLE 3

A water-in-oil emulsion having the following composition is prepared:

| | Percent |
|---|---|
| Arlacel 80 | 1.25 |
| Arlacel 83 | 1.25 |
| Liquid paraffin/white soft paraffin (86.4 pt./9.6 pt.) | 60.0 |
| Aqueous polio vaccine, containing suitable doses of virus types, I, II, III or combinations thereof | 37.5 |

The emulsion is used to prepare soft gelatin capsules containing $10^5$ virus particles per capsule. The capsules are stable indefinitely at −20° C. and for seven weeks at room temperature.

This compares favourably with the result obtained using an emulsion as described above in which the oil is solely light liquid paraffin. Capsules prepared from such an emulsion collapsed after 3 to 4 days at room temperature.

We claim:

1. A soft capsule of water-soluble plastic containing an oral dosage unit pharmaceutical composition comprising a liquid aqueous medicament, which otherwise would deleteriously effect collapse of said soft capsule, in the form of a water-in-oil emulsion, said emulsion and the continuous phase thereof having, respectively, viscosities of at least 6,000 cps. at 20° C. at a shear rate of 1 $sec.^{-1}$ and at least 100 cps. at 20° C. and at high shear rate, whereby at the normal storage temperature of the capsulated composition, migration of the globules of the internal water phase which normally causes capsule collapse is substantially prevented.

2. A capsulated composition as claimed in claim 1 in which the medicament is an aqueous vaccine.

3. A capsulated composition as claimed in claim 2 in which the medicament is an aqueous oral poliomyelitis vaccine.

4. A capsulated composition as claimed in claim 1 in which the viscosity of the emulsion is at least 10,000 cps. at 20° C. at a shear rate of 1 $sec.^{-1}$.

5. A capsulated composition as claimed in claim 4 in which the viscosity of the emulsion is at least 15,000 cps. at 20 C. at a shear rate of 1 $sec.^{-1}$.

6. A capsulated composition as claimed in claim 1 in which the viscosity of the continuous phase of the emulsion is at least 370 cps. at 20° C. and at high shear rate.

7. A capsulated composition as claimed in claim 1 in which the viscosities of the emulsion and the continuous phase thereof are such that, at 20° C. migration of the globules of the internal water phase is substantially prevented.

8. A capsulated composition as claimed in claim 1 in which the viscosities of the emulsion and the continuous phase thereof are such that, at −20° C., migration of the globules of the internal water phase is substantially prevented.

9. A capsulated composition as claimed in claim 8 in which the viscosities of the emulsion and the continuous phase thereof are such that, at 4° C., migration of the globules of the internal water phase is substantially prevented.

10. A capsulated composition as claimed in claim 1 in which the soft capsule is made of a water-soluble plasticised gelatin material.

11. A capsulated composition as claimed in claim 10 in which the gelatin is plasticised with glycerine.

12. A capsulated composition as claimed in claim 1 in which the oil phase of the water-in-oil emulsion comprises a pharmaceutical grade mineral oil.

13. A capsulated composition as claimed in claim 12 in which the pharmaceutical grade mineral oil is a liquid paraffin.

14. A process as claimed in claim 1 in which the oil phase comprises a vegetable oil.

15. A capsulated composition as claimed in claim 12 in which the oil phase of the water-in-oil emulsion contains a thickening agent.

16. A capsulated composition as claimed in claim 15 in which the thickening agent comprises white soft paraffin.

17. A capsulated composition as claimed in claim 16 in which the oil phase of the water-in-oil emulsion comprises a liquid paraffin containing from 1 to 40% by weight of the white shoft paraffin.

18. A capsulated composition as claimed in claim 17 in which the oil phase contains about 8% by weight of the white soft paraffin.

19. A capsulated composition as claimed in claim 1 in which the water-in-oil emulsion is stabilised by at least one oil-soluble emulsifying agent.

20. A capsulated composition as claimed in claim 19 in which an emulsifying agent, or mixture of emulsifying agents, is used having a hydrophilic lipophilic balance of from 1 to 8.

21. A capsulated composition as claimed in claim 20 in which an emulsifying agent, or mixture of emulsifying agents, is used having a hydrophilic lipophilic balance of from 2 to 5.

22. A capsulated composition as claimed in claim 21 in which an emulsifying agent, or mixture of emulsifying agents, is used having a hydrophilic lipophilic balance of about 4.

23. A capsulated composition as claimed in claim 19 in which at least one of sorbitan sesquioleate and sorbitan mono-oleate is used as emulsifying agent.

24. A capsulated composition as claimed in claim 23 in which a mixture of substantially equal proportions of sorbitan sesquioleate and sorbitan mono-oleate is used as emulsifying agent.

25. A capsulated composition as claimed in claim 19 in which at least one of sorbitan trioleate and polyoxyethylene sorbitan mono-oleate is used as emulsifying agent.

26. A capsulated composition as claimed in claim 19 in which the proportion of emulsifying agent in the emulsion is in the range of from 1 to 7% by weight.

27. A capsulated composition as claimed in claim 26 in which the proportion of emulsifying agent is in the range of from 2 to 6% by weight.

28. A capsulated composition as claimed in claim 1 in which the emulsion contains from 20 to 95% by weight of the oil phase.

29. A capsulated composition as claimed in claim 28 in which the emulsion contains from 50 to 70% by weight of the oil phase.

30. A capsulated composition as claimed in claim 29 in which the emulsion contains about 60% by weight of the oil phase.

References Cited

UNITED STATES PATENTS

| | | | |
|---|---|---|---|
| 2,183,053 | 12/1939 | Taylor | 167—81 |
| 2,314,527 | 3/1943 | Taylor | 167—83 X |
| 2,780,355 | 2/1957 | Palermo et al. | 167—83 X |
| 2,966,443 | 12/1960 | Cox | 167—78 |
| 3,096,249 | 7/1963 | Prigal | 167—82 |
| 3,099,601 | 7/1963 | Davis et al. | 167—78 |
| 3,126,321 | 3/1964 | Kurtz | 167—83 |
| 3,149,036 | 9/1964 | Woodhour et al. | 167—78 |
| 3,185,625 | 5/1965 | Brown | 167—82 |
| 3,240,670 | 3/1966 | Feinberg | 167—82 |
| 2,946,724 | 7/1960 | Valentine | 167—78 |

LEWIS GOTTS, *Primary Examiner.*

S. K. ROSE, *Assistant Examiner.*